United States Patent
Teixeira Gomes et al.

(10) Patent No.: US 12,407,167 B2
(45) Date of Patent: Sep. 2, 2025

(54) RENEWABLE ENERGY POWER PLANT FAST FREQUENCY RESPONSE

(71) Applicant: VESTAS WIND SYSTEMS A/S, Aarhus N (DK)

(72) Inventors: Ricardo Manuel Teixeira Gomes, Oporto (PT); Ines Pereira Barreira, Aarhus C (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 18/718,394

(22) PCT Filed: Oct. 31, 2022

(86) PCT No.: PCT/DK2022/050227
§ 371 (c)(1),
(2) Date: Jun. 10, 2024

(87) PCT Pub. No.: WO2023/104263
PCT Pub. Date: Jun. 15, 2023

(65) Prior Publication Data
US 2025/0055280 A1     Feb. 13, 2025

(30) Foreign Application Priority Data
Dec. 9, 2021   (DK) .............. PA202170604

(51) Int. Cl.
*H02J 3/32*     (2006.01)
*F03D 7/02*     (2006.01)
(Continued)

(52) U.S. Cl.
CPC .............. *H02J 3/32* (2013.01); *F03D 7/0284* (2013.01); *F03D 9/11* (2016.05); *H02J 3/381* (2013.01);
(Continued)

(58) Field of Classification Search
CPC .......... H02J 3/32; H02J 2300/28; H02J 3/381; H02J 3/48; H02J 2300/24; H02J 2300/40;
(Continued)

(56) References Cited

U.S. PATENT DOCUMENTS

2010/0138058 A1   6/2010  Kirchner et al.
2021/0167601 A1*  6/2021  Gupta .................. G05B 15/02
2021/0336443 A1  10/2021  Moller et al.

FOREIGN PATENT DOCUMENTS

EP    2573896 A1    3/2013
EP    2733812 A2    5/2014
(Continued)

OTHER PUBLICATIONS

Danish Patent and Trademark Office, 1st Technical Examination including The Search Report and Search Opinion for Application PA 2021 70604 dated Jun. 16, 2022.
(Continued)

*Primary Examiner* — Ryan Johnson
(74) *Attorney, Agent, or Firm* — Patterson + Sheridan, LLP; Gero G. McClellan; Charles Yeh

(57) ABSTRACT

Aspects of the present invention relate to a method of controlling a renewable energy power plant connected to a power network. The renewable energy power plant comprises one or more renewable energy generators having an active power reserve for supplying additional active power to the power network and an energy storage system having an active power store. In response to detecting a frequency event on the power network a power sequence is implemented to manage the additional active power contributions from the energy storage system and the one or more renewable energy generators to satisfy the active power request.

19 Claims, 8 Drawing Sheets

(51) Int. Cl.
*F03D 9/11* (2016.01)
*H02J 3/38* (2006.01)
*H02J 3/46* (2006.01)
*H02J 3/48* (2006.01)

(52) U.S. Cl.
CPC ............... *H02J 3/466* (2020.01); *H02J 3/48* (2013.01); *H02J 2300/24* (2020.01); *H02J 2300/28* (2020.01); *H02J 2300/40* (2020.01); *Y02E 70/30* (2013.01)

(58) Field of Classification Search
CPC .......... H02J 3/466; H02J 3/46; H02J 2300/20; Y02E 70/30; F03D 9/11; F03D 7/048; F03D 7/0284
See application file for complete search history.

(56) References Cited

FOREIGN PATENT DOCUMENTS

| EP | 3823125 A1 | 5/2021 |
|----|------------|--------|
| WO | 2021037320 A1 | 3/2021 |
| WO | 2021190718 A1 | 9/2021 |

OTHER PUBLICATIONS

PCT International Search Report and Written Opinion of The International Searching Authority for Application PCT/DK2022/050227 dated Feb. 6, 2023 (Feb. 6, 2023).

\* cited by examiner

RENEWABLE ENERGY POWER PLANT FAST FREQUENCY RESPONSE

TECHNICAL FIELD

The present disclosure relates to a method of controlling a renewable energy power plant. Aspects of the invention relate to a power plant controller, and to a renewable energy power plant.

BACKGROUND

Regulators and operators of power networks expect connected power plants to adhere to a 'grid code' and to provide ancillary services to the power network.

For example, national or international power networks have a nominal frequency, also referred to as the utility or mains frequency, which is typically 50 Hz or 60 Hz. Some operators require power plants to support the power network when the frequency of the power network deviates from a normal operational range around the nominal frequency. Such changes in frequency are undesirable, as equipment to which power is supplied is configured to operate at a particular frequency with a relatively tight tolerance. Thus, where frequency deviates from the nominal frequency, even by less than 1 Hz, it is important to correct the deviation quickly, typically within a few seconds of the deviation at most.

A range of control strategies have been developed for renewable energy power plants to counteract frequency deviations of the power network. However, it remains an aim to reduce the time taken to correct a frequency deviation, and to provide a fast frequency response.

It is against this background that the present invention has been devised.

SUMMARY OF THE INVENTION

According to an aspect of the present invention there is provided a method of controlling a renewable energy power plant connected to a power network. The renewable energy power plant comprises one or more renewable energy generators having an active power reserve for supplying additional active power to the power network and an energy storage system having an active power store. The method comprises, in response to detecting a frequency event on the power network: determining an active power request for the renewable energy power plant based on the frequency event; and implementing a power sequence to manage the additional active power contributions from the energy storage system and the one or more renewable energy generators to satisfy the active power request. The power sequence comprises: initiating a first power stage in response to detecting the frequency event, wherein the active power contribution from the energy storage system is controlled during the first power stage by: determining an initial power shortage between the active power request and the active power output from the one or more renewable energy generators; determining a first active power set point for the energy storage system based on the initial power shortage, dispatching the first active power set point to the energy storage system to cause the energy storage system to increase the active power output to the power network from the active power store; and detecting when the active power output from the energy storage system is equal to the first active power set point; and initiating a second power stage once the active power output from the energy storage system is equal to the first active power set point, wherein the active power contribution from the energy storage system is controlled during the second power stage by: determining a subsequent power shortage between the active power request and the active power output from the one or more renewable energy generators; and determining and dispatching a second active power set point for the energy storage system based on the subsequent power shortage.

The frequency event may comprise an under-frequency event. During an under-frequency event, the frequency level of the power network drops below a nominal frequency of the network.

In this manner, the first stage of the power sequence is configured to rapidly increase, or ramp up, the active power output from the energy storage system, making advantageous use of the dynamic active power store to provide a fast frequency response to a frequency deviation. The second stage of the power sequence is configured to continue satisfying the active power request whilst maximally conserving energy reserves in the active power store by minimising the active power contribution from the energy storage system.

The first power stage or the second power stage may further comprise: determining a third active power set point for the one or more renewable energy generators based on the active power request, and dispatching the third active power set point to the one or more renewable energy generators to cause the one or more renewable energy generators to increase the active power output to the power network using the active power reserve. For example, the third active power set point may correspond to the active power request. In this manner, the active power output from the renewable energy generator(s) is increased to maximise the contribution of the renewable energy generator(s) to the active power request, allowing the active power output of the energy storage system to be minimised during the second power stage.

For example, the third active power set point may be determined and dispatched to the one or more renewable energy generators during the first power stage if the initial power shortage is greater than the first active power set point, or if the initial power shortage is greater than a power limit of the energy storage system. Alternatively, the third active power set point may be determined and dispatched to the one or more renewable energy generators during the second power stage if the initial power shortage is less than, or equal to, the first active power set point or the power limit of the energy storage system.

Dispatching the third active power set point to the one or more renewable energy generators may cause (i.e. control) the one or more renewable energy generators to ramp up the active power output from the active power reserve at a first ramp rate. Dispatching the first active power set point to the energy storage system may cause (i.e. control) the energy storage system to ramp up the active power output from the energy store at a greater ramp rate than the first ramp rate.

Dispatching the first active power set point to the energy storage system may, for example, cause (i.e. control) the energy storage system to ramp up the active power output from the energy store at a maximum ramp rate for the energy storage system. In this manner, the active power output from the energy storage system may be increased as quickly as possible in response to the frequency deviation.

Dispatching the second active power set point to the energy storage system may cause (i.e. control) the energy storage system to ramp down the active power output from the energy store at a second ramp rate during the second power stage, for example, if the active power reserve of the one or more renewable energy generators is greater than, or equal to, the determined subsequent power shortage. Optionally, the second ramp rate may be of equal magnitude to the first ramp rate.

Dispatching the third active power set point to the one or more renewable energy generators may, for example, cause (i.e. control) the one or more renewable energy generators to maximise the active power contribution from the active power reserve during the second power stage.

Optionally, the power sequence may be implemented to provide a fast frequency response to the frequency event. The active power request may, for example, correspond to an amount of active power to be provided by the renewable energy power plant to the power network to provide the fast frequency response.

Optionally, the energy storage system may be a battery energy storage system.

Optionally, the renewable energy power plant may be a hybrid power plant.

Optionally, the one or more renewables energy generators comprises one or more: wind turbine generators, and/or photovoltaic generators.

The second active power set point may be continuously, or periodically, redetermined during the second power stage. For example, the second active power set point may be continuously, or periodically, redetermined according to the steps described above, where the power shortage may be redetermined at each iteration.

According to a further aspect of the invention there is provided a power plant controller configured to perform the method as described in a previous aspect of the invention.

According to another aspect of the invention there is provided a computer-readable storage medium comprising instructions that, when executed by a computer, cause the computer to perform the method as described in a previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
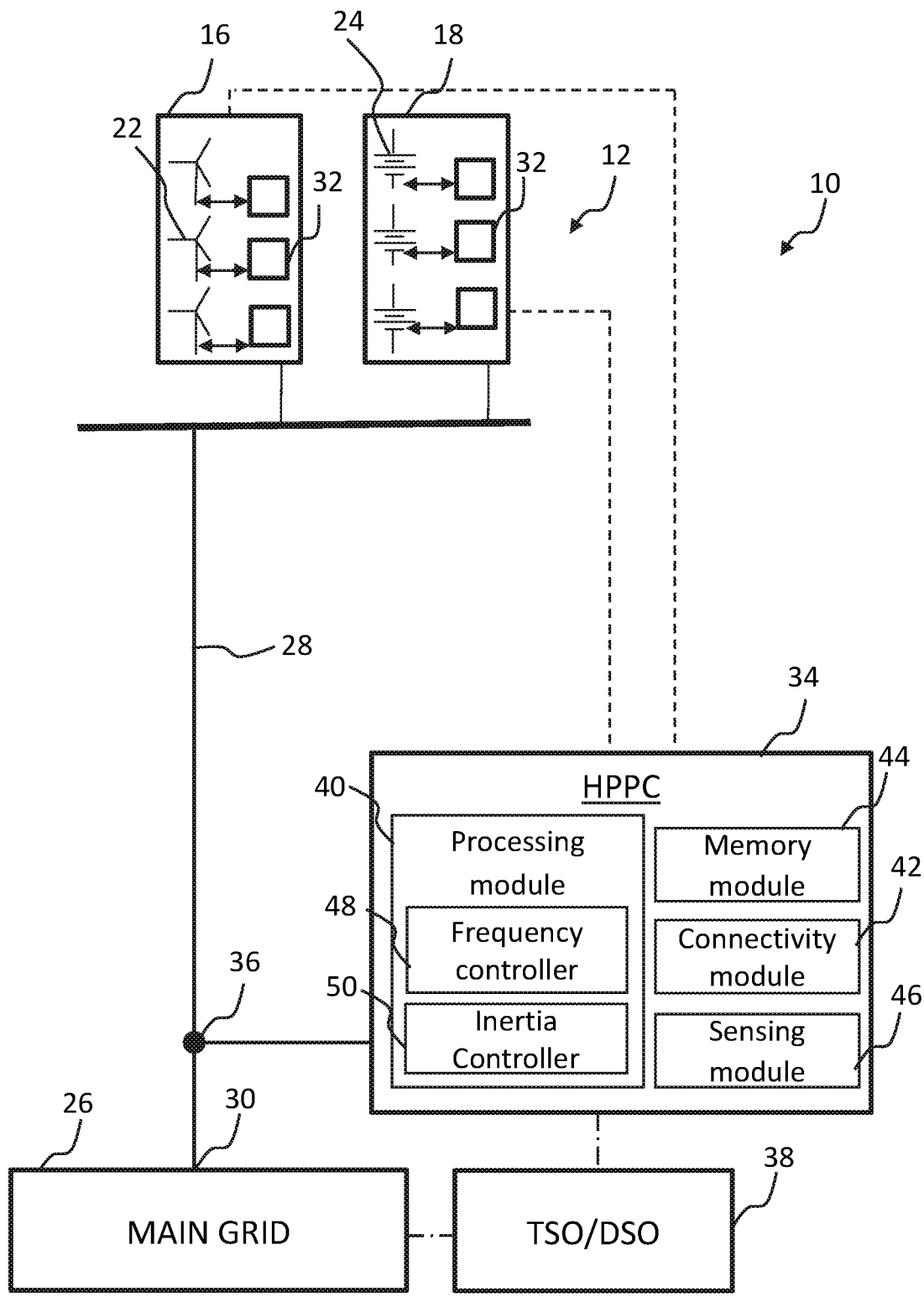
FIG. 1 is a schematic representation of a renewable energy power plant, its connection to a power network, and its control system.

Generally, the present application relates to a method of controlling a renewable energy power plant during an under-frequency event and to a configuration of a power plant controller for implementing such a method. The renewable energy power plant comprises an energy storage system having an active power store and one or more renewable energy generators having an active power reserve for supplying additional active power to a power network connected to the power plant. In response to the under-frequency event, the power plant is controlled to supply additional active power to counteract the frequency deviation.

The method makes use of a control strategy, which may also be thought of as a 'scheme', 'distribution', or 'configuration', according to which the energy storage system and the renewable energy generators are employed to provide the additional active power required to counteract the frequency deviation. In general, this control strategy may comprise implementing a priority list, or power sequence, to manage the additional active power contributions from the energy storage system and the renewable energy generators. During an initial stage of the power sequence, the active power contribution from the energy storage system is increased at a maximum rate to provide the fastest possible response to the frequency deviation. Once the active power contribution from the energy storage system has reached a power limit or set point, the power sequence enters a second stage, during which the active power contribution from the energy storage system is reduced or minimised to conserve energy in the active power store, while the active power contribution from the renewable energy generators increases. During this second stage, full use of the active power reserve may be implemented to maximise the active power contribution from the renewable energy generators and simultaneously to minimise the active power contribution from the energy storage system.

Such a method enables an efficient fast frequency response from the power plant, whilst maximally conserving the active power store of the energy storage system for subsequent usage. It is envisaged that the invention will therefore provide for a faster response to a frequency deviation, improving the stability of the grid.

The term and concept of 'fast frequency response' (FFR) as used herein is defined as the fast correction of power imbalances that cause frequency deviations. National or international power networks typically have a nominal frequency, also referred to as the utility or mains frequency. Around the world, this nominal frequency is typically 50 Hz or 60 Hz. Changes in frequency are undesirable, as equipment to which power is supplied is configured to operate a particular frequency with a relatively tight tolerance. Thus, where frequency deviates from the nominal frequency, even by less than 1 Hz, it is important to correct the deviation quickly, typically within a few seconds of the deviation at most. Accordingly, a fast rectification and reinstatement of frequency to its nominal value is desirable in these situations, and this is provided by FFR. Grid regulations may penalise or disconnect plants that are seen to be de-stabilising the frequency and grid as a whole and/or not responding to deviations in frequency.

FFR encompasses inertia emulation and inertia emulated control. FFR is typically performed in short timeframes and is dependent upon specific grid regulations. Accordingly, frequency control during FFR is supplied according to predetermined curves and/or predetermined calculations relating to the amount of active power to inject to the grid to counteract particular changes in frequency. FFR should be distinguished from frequency control. Frequency control is the maintenance of frequency levels within a small dead-band around a nominal frequency and is the primary response of the system during normal operation. FFR is the response of the system in extraordinary circumstances, when a rate of change of frequency is greater than a threshold, or when the frequency deviates outside of the dead-band or from its nominal value beyond a threshold value. Accordingly, FFR depends on one or more triggers, as will be discussed in detail below.

The FFR is typically provided by an inertia controller, which operates alongside a frequency controller, both controllers being disposed within a power plant control system. The inertia controller is configured to determine one or more of the triggers, to determine additional amounts of active power to be requested from the power generators, and to dispatch requests for this active power accordingly as set points or references as appropriate.

To aid with the explanation of the provision of fast frequency response within a renewable energy power plant, FIG. 1 illustrates a typical architecture in which a renewable energy power plant (PP) is connected to a main transmission grid as part of a wider power network. The PP comprises an energy storage system and one or more renewable energy generators. The PP may comprise a single type of renewable energy generator, such as wind turbine generators (WTG) s, as in this example, or the PP may take the form of a hybrid power plant (HPP), which comprises at least two different types of renewable energy generators, such as a solar power system and a wind power system.

Where 'types' of generator are discussed herein, a type of generator is generally defined in relation to its source of renewable energy so that different types of generator generate energy from different renewable energy sources. For example, wind turbine generators in a hybrid plant may be considered to be one type of generator because they generate energy from wind energy. Photovoltaic cells may be another type of generator, as these generators generate energy from a different source to wind energy, i.e. solar energy. In some embodiments, generators of other power plants may be considered to be a separate type as they generate from a differently located source of renewable energy, even if the type of the source is the same. In other words, two wind power systems may be considered to be different types of generator due to being situated in different locations.

The examples shown in the figures are representative only and the skilled reader will appreciate that other specific architectures of renewable energy power plants are possible. For example, it is possible that that the PP may feature any one type of renewable energy generator, as shown in FIG. 1, or the renewable energy power plant may be configured as a hybrid power plant having two or more types of generator incorporated as respective generator systems. Furthermore, it will be understood by the skilled reader that a generator system of the PP may be formed by a single generator.

Therefore, as a generator system may comprise a single generator and a hybrid power plant requires two or more generator systems, a hybrid power plant may be defined as a power plant incorporating at least two renewable energy generators, in which the power generated by the power plant is generated from at least two different sources of renewable energy. While PV, and wind, are discussed herein, it will also be appreciated that other forms of renewable energy generator may also be included in the renewable energy power plant as appropriate, and that the concepts of reserves described below also apply to other types of generators.

Similarly, for the purpose of the following description, the energy storage system takes the form of a battery energy storage system (BESS). However, while batteries, are discussed herein, it will also be appreciated that other forms of energy storage systems may also be included in the renewable energy power plant as appropriate, and that the concepts of energy stores described below also apply to other types of energy storage systems providing such systems are able to provide a similarly dynamic response to a frequency deviation. In other words, in examples, the PP may include energy storage systems other than battery energy storage systems providing that such energy storage systems are able to increase their active power contribution at a similar rate to a battery energy storage system or at least at a faster rate than the renewable energy generators of the PP. For example, other energy storage systems may include fuel cell systems, and/or systems including electric double-layer capacitors.

The skilled reader will appreciate that methods, systems and techniques also described below may be applicable to many different configurations of power network. Moreover, the components of the renewable energy power plant and power network are conventional and as such would be familiar to the skilled reader. It is expected that other known components may be incorporated in addition to or as alternatives to the components shown and described in FIG. 1. Such changes would be within the capabilities of the skilled person.

Considering FIG. 1 in more detail, a power system 10 incorporates the PP 12. The PP 12 includes the wind power system 16 and the battery energy storage system 18. The wind power system 16 comprises a plurality of wind turbine generators (WTGs) 22 configured to convert wind energy into electrical energy. The battery energy storage system 18 comprises one or more battery units 24, in particular rechargeable batteries, providing centralised or semi-centralised energy stores for the PP 12. For example, the battery energy storage system 18 may include a plurality of electrochemical batteries, such as lithium-ion batteries and/or solid state batteries for example, operable to store and release electrical energy as required. Single WTGs 22, or battery units 24 would also be possible in each of these systems 16, 18. The electrical energy generated or released by each system 16, 18 is transferred to a main transmission network or main grid 26, as active current, for distribution.

As already discussed, fast frequency response is implemented by the provision of additional active power from the PP 12 to the main grid 26. Each WTG 22 is capable of providing additional active power beyond its normal active power generation during fast frequency response in at least one way.

For example, WTGs 22 are configured to incorporate a so-called 'spinning reserve'. The spinning reserve includes at least an extra amount of the available active power that is designated as being for ancillary services, such as the provision of fast frequency response. Typically, WTGs have a rated power or maximum power generation capability in normal operation, such as 3 MW for example, and the spinning reserve comprises a designated amount of this rated power. For example, a percentage of the rated power may be specifically designated and marked for use as spinning reserve. Therefore, this spinning reserve is not used during normal power generation, so that the maximum output of the WTG is a set amount below the rated power. For example, a wind turbine generator may have a nominal power of 3 MW, of which 10% is designated as being spinning reserve. So, 0.3 MW of the wind turbine generator's power capability is reserved for responding to under-frequency events, so that the maximum active power generation of that generator in normal circumstances is 2.7 MW.

The spinning reserve may include any further capacity of the WTGs that is not currently in use and therefore available for increasing generation. Of course, this assumes that the wind speed is high enough to sustain such an increase. Again using the example of a 3 MW rated WTG that has 10% spinning reserve, if the WTG is only outputting 1.5 MW instead of its maximum of 2.7 MW, then 1.5 MW is still available for use as spinning reserve.

The battery units 24 comprise stores of charge for supplying active power on demand, known as active power stores, and a portion of the active power stores may be designated as a reserve of active power for use in fast frequency response. In some embodiments, the entire capacity of the battery energy storage system 18 may be for the purpose of fast frequency response—i.e. the battery system 18 is wholly designed and provided for that purpose. In contrast to wind turbine generators 22, the battery units 24 are non-generating systems, and so the reserve is not an additional amount on top of generating power, but the amount of power stored within the active power stores.

As the battery energy storage system 18 requires some charge to be able to discharge active power, limits may be defined or specific amounts of charge may be set aside to be provide a reserve for certain situations. For example, maximum and minimum levels of the state of charge of the battery energy storage system may be defined for fast frequency response, frequency control other than fast frequency response, and for overall operation of the storage system (other than the absolute maximum, i.e. full charge, and minimum, i.e. wholly depleted).

Returning to FIG. 1, each of the WTGs 22 and battery units 24 is arranged to provide active power to the main grid 26, and may each be referred to as a 'power unit' in this description. Within each system 16, 18, each of the power units 22, 24 is connected to a local grid (not shown) that links the power units 22, 24. The systems 16, 18 may also be joined to one another by a suitable inter-system grid (also not shown) or a collector bus. Via this grid or collector bus, the PP 12 is connected to the main grid 26 (also called a main power network) via a connecting network 28. The PP 12 and the main grid 26 are connected at a Point of Interconnection (PoI) 30, which is an interface between the PP 12 and the main grid 26. It should be assumed that references to components being connected or connections between components comprise suitable feeder or transmission lines unless it is otherwise indicated.

Each of the power units 22, 24 within the systems 16, 18 of FIG. 1 is associated with a respective power unit controller, generally labelled 32. In some embodiments, a sub-set of power units 22, 24, such as those within the wind power system 16, may share a single, semi-centralised controller, such that there are fewer power unit controllers than power units. As would be apparent to the skilled person, power unit controllers 32 can be considered to be computer systems capable of operating a WTG 22 and/or a battery unit 24 in the manner prescribed herein, and may comprise multiple modules that control individual components of each power unit 22, 24.

During operation of the PP 12, the power unit controllers 32 operate to implement active and reactive power requests received from a power plant controller (PPC) 34 at their respective power unit(s) 22, 24. In some embodiments, the PPC 34 may be connected directly to the power units 22, 24 without an intermediary controller and may distribute set points accordingly.

The PPC 34 is connected to the power network 10 at a Point of Measurement (POM) 36 and is also connected directly to each of the systems 16, 18 of the PP 12. The role of the PPC 34 is to act as a command and control interface between the PP 12 and the grid 26, and more specifically, between the systems 16, 18 and a grid operator or transmission system operator (TSO) 38. The PPC 34 is a suitable computer system for carrying out the controls and commands as described above and so incorporates a processor 40, a connectivity module 42, a memory module 44, and a sensing module 46. The processor 40 incorporates a frequency controller 48 and an inertia controller 50.

The inertia controller 50 conventionally acts to provide an inertia response based on a change in active power in dependence on frequency. The inertia controller 50 may also provide a frequency response based on a deviation of frequency, as discussed herein. The PPC 34 may also receive information regarding the grid 26 and/or connecting network 28 from an energy management system (not shown) or by direct measurement.

The PPC 34 is connected to the connecting network 28 to allow monitoring and regulation of the output of the PP 12 and to interpret power demands correctly. The PPC 34 measures a variety of parameters that are representative of the state of the grid 26 and PP 12, and that can be used to improve the outputs of the PP 12 to best meet the requirements of the TSO 38 or as set out in a set of grid-specific requirements.

As noted, the systems 16, 18 of the PP 12 are capable of altering their power output in reaction to commands received from the PPC 34 by virtue of specific controllers. It will be noted that FIG. 1 is a schematic view, so the way in which the control commands are transferred is not depicted explicitly. However, it will be appreciated that suitable cabling may be provided to interconnect the PPC 34 and the systems 16, 18, power units 22, 24 or power unit controllers 32. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

As discussed above, the PPC 34 manages the PP 12 according to a set of grid requirements that are specific to the main grid 26. In this description, the focus is on the regulation of the frequency of the main grid and the provision of FFR by the PP 12, as implemented by the PPC 34.

During frequency deviations, a PP 12 according to the embodiments described herein and operated by a PPC 34 according to the methods described herein employs a fast frequency response to counteract frequency deviations. During under-frequency events or 'frequency drops', in which the frequency drops below its nominal level, the PP 12 is configured to react by increasing its active power contribution to the grid to increase the frequency level. During over-frequency events, in which the frequency rises above its nominal level, the PP 12 configured to react by reducing its active power output to the grid to reduce the frequency level.

The following description focusses on under-frequency events and the fast frequency response to these under-frequency events.

As noted above, there is a difference between frequency control during normal circumstances and FFR. FFR is initiated by one or more trigger events identified at the PPC, specifically within the inertia controller. FFR triggers include fulfilment of criteria, including: a frequency error value exceeding a threshold, frequency dipping below a threshold, and a rate of change of frequency above a threshold value.

For example, at the start of an under-frequency event, the frequency begins to fall from its nominal frequency, which may be a frequency of 50 Hz for example, and the rate of change of frequency is high, such that the error value exceeds its threshold. Consequently, a trigger occurs and fast frequency response is initiated. FFR provides an increased active power output to the main grid 26, which acts to counteract the under-frequency event such that the decline in frequency is slowed, reducing the rate of change of frequency until a frequency minimum is reached, and the frequency begins to rise again. Thereafter, the frequency level typically reaches a plateau that is within threshold values of the nominal frequency, and a subsequent period is entered during which 'secondary frequency control' is performed. Secondary frequency control is frequency control to restore the frequency to the nominal frequency using conventional frequency control, and so is not considered to be part of the FFR.

FFR may therefore terminate when one or more of the following criteria is fulfilled: an over-boost period ends; a period of time has elapsed since the initial trigger; and/or the frequency error value is reduced to an acceptable level/the frequency rises back to the band around the nominal value.

Now considering the FFR in more detail. In response to the FFR trigger, the PPC 34, and particularly the inertia controller 50, implements one or more control strategies and controls the generators of the PP 12 accordingly, as shall now be described in more detail.

Figure 2:
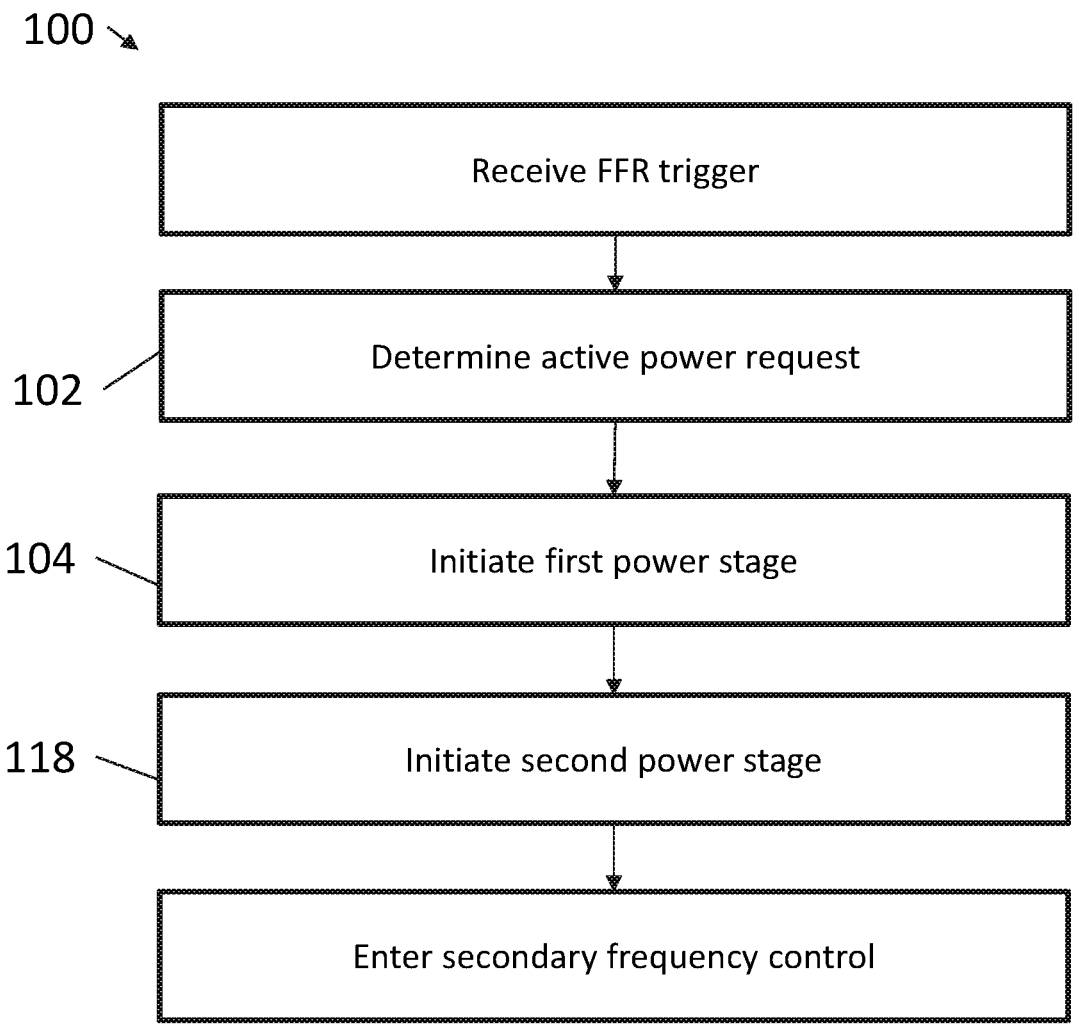
FIG. 2 shows a method for operating the power plant of FIG. 1 according to an embodiment of the invention.
Figure 3:
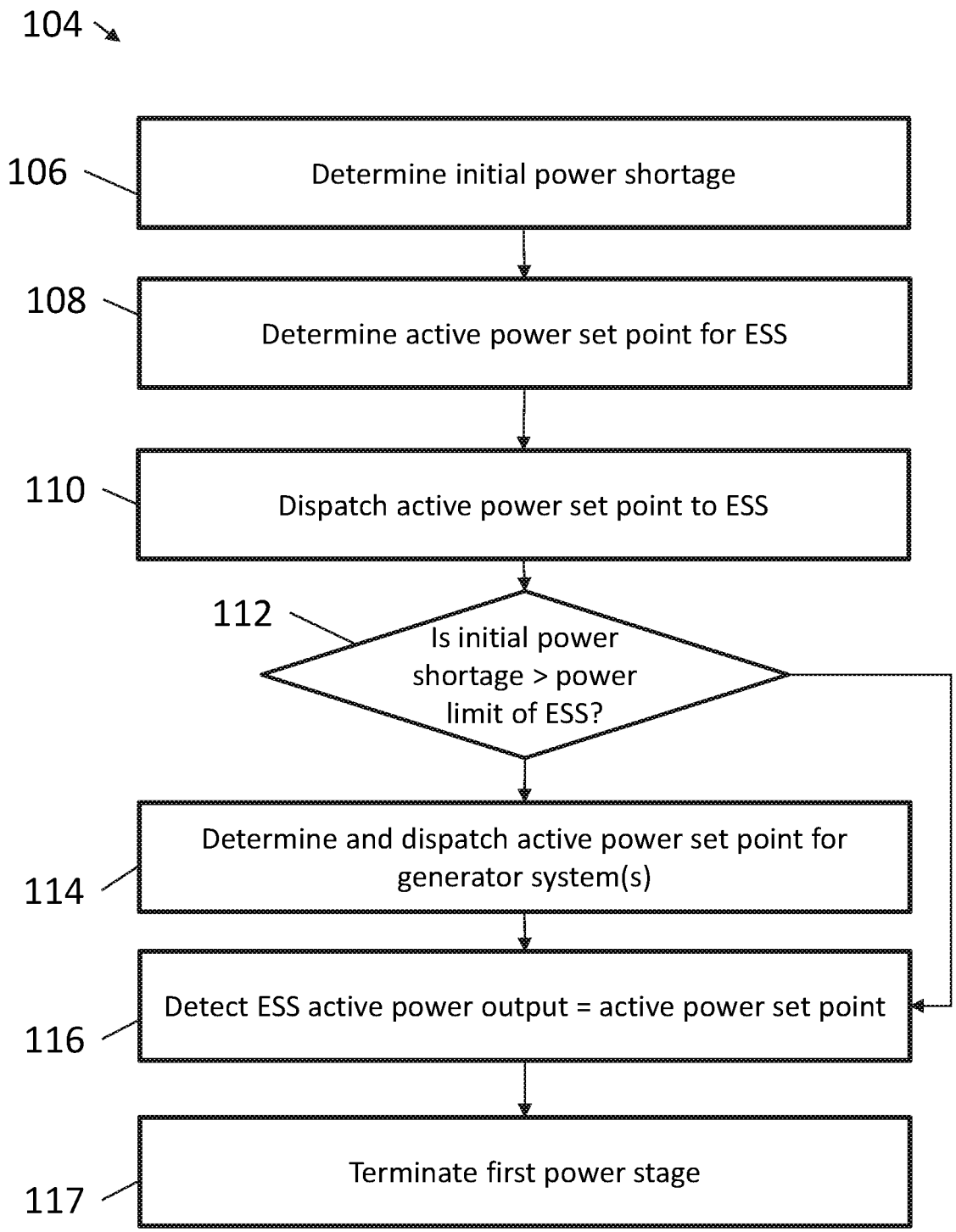
FIG. 3 shows example sub-steps, in accordance with an embodiment of the invention, of the method shown in FIG. 2.

During the under-frequency event, the PPC 34 is configured to implement the method 100 of FIGS. 2 and 3.

In a first step 102, an amount of active power to be provided by the PP 12 to the main grid 26 to provide FFR is determined at the PPC 34. For example, the PPC 34 may receive a power reference from the grid operator or transmission system operator (TSO) 38 and calculate a power change ($\Delta P$) based on the frequency. The PPC 34 may then determine the active power request by adding the power change ($\Delta P$) to the power reference. In this manner, the active power request accounts for various power transmission losses, and other variables such as the position of the detector, and whether the PP 12 is connected to a weak grid for example.

In response to the active power request, the PPC 34 is configured to implement a priority list, or power sequence, to manage the additional active power contributions from the battery energy storage system 18 and the wind power system 16 to satisfy the active power request.

In this respect, the power sequence accounts for the fact that, in practice, the active power contributions from the wind power system 16 and the battery energy storage system 18 can be increased at different rates. In particular, when increasing the active power contribution from the wind power system 16 in response to a frequency deviation, the ramp rate of the wind power system 16 is generally limited in order to curb the mechanical loads imposed on the WTGs 22. Such limits are usually required because, in order to provide a fast response to the frequency deviation, it is typically necessary to increase the active power contribution from each WTG 22 by increasing the generator torque. In this respect, pitching is also important but is generally considered too slow for FFR. However, significantly increasing the generator torque in this manner will increase the loads imposed on the mechanical parts of the WTG 22, leading to damage. Therefore, the PPC 34 or the unit controller 32, for example, may impose limits to the rate that each WTG 22 can ramp up its active power contribution.

It shall be appreciated that such considerations are not relevant to the battery energy storage system 18 though, where the active power contribution is increased by an electro-chemical process. In theory, the rate of increase of the active power contribution of the battery energy storage system 18 may only be limited by the speed of the electro-chemical processes, which will be significantly faster than any of the limits that would typically be applied to the WTGs 22. In practice though, the PPC 34 or the unit controllers 32 of the battery energy storage system 18 may impose limits to the ramp rate of the battery units 24 to increase the active power output from the active power store in a controlled manner. In any case, such ramp rate limits are typically significantly larger than the ramp rate limits applied to the wind power system 16, such that the battery energy storage system 18 has the ability to provide a much faster response to the active power request than the wind power system 16.

As shall be appreciated by the skilled person, in other examples, having different generator systems and energy storage systems, similar considerations will apply, where the invention is applicable to power plant systems having a more dynamic, i.e. faster, energy storage system than the respective energy generator system(s).

Accordingly, in step 104, the PPC 34 initiates a first power stage of the active power sequence.

During the first power stage, the active power contribution from the battery energy storage system 18 is increased as quickly as possible, i.e. at a maximum rate, to provide a fast response to the frequency deviation. Here, it shall be appreciated that the battery energy storage system 18 is effectively prioritised over the wind power system 16 because of its ability to provide a faster response to the active power request.

An example of the first power stage is shown in FIG. 3, as shall be described in more detail below.

In step 106, the PPC 34 determines an initial power shortage of the WTGs 22 (or more generally the renewable energy generators) relative to the active power request. For example, the PPC 34 may receive a measurement of the active power output of the WTGs 22 and compare the active power output to the active power request to determine the initial power shortage.

In step 108, the PPC 34 is configured to determine an initial active power set point, i.e. a first active power set point, for the battery energy storage system 18 based on the initial power shortage. The first active power set point may correspond to the active power shortage or a power limit of the battery energy storage system 18. For example, the energy storage system 18 may have a rated or maximum power output that is less than the initial power shortage, in which case the PPC 34 may set the first active power set point to the level of the rated power output.

The first active power set point is dispatched by the PPC 34 to the battery energy storage system 18, in step 110. In response, the battery energy storage system 18 is controlled to increase the active power output from the active power store to the first active power set point. In particular, in response to receiving the first active power set point, the unit controllers 32 of the battery energy storage system 18 may control the battery energy storage system 18 to rapidly increase the active power output from the active power store to the first active power set point. Here, to provide the fastest possible response to the frequency deviation, the battery energy storage system 18 may be controlled to increase its active power output as quickly as possible, i.e. at a maximum rate of increase. For example, upper limits associated with the control may, for example, control the battery energy storage system 18 to ramp up the active power output at a maximum ramp rate.

As shown in FIG. 3, in examples, the PPC 34 may also determine whether to increase the active power output from the energy reserve of the wind power system 16 (or more generally the generator system 16 of the PP 12), during the first power stage. In particular, the PPC 34 may determine that it is necessary to increase the active power output from the wind energy system 16 during the first power stage if the initial power shortage is suitably large.

For example, as shown in FIG. 3, the PPC 34 may be configured to determine the initial power shortage between the active power request and the active power output of the generator systems, in step 106, and to compare the initial power shortage to a reference power level, in step 112, to determine whether to increase the active power output from the wind energy system 16. The reference power level in this case may correspond to a power limit of the battery energy storage system 18, such as the rated power output of the battery energy storage system 18 or the first active power set point determined in step 110. In this manner, the PPC 34 may determine whether the initial power shortage is larger than a power limit of the battery energy storage system 18.

If the initial power shortage exceeds the power limit of the battery energy storage system 18, i.e. if the initial power shortage is greater than first active power set point, the PPC 34 may proceed to determine and dispatch another active power set point, i.e. a second active power set point, for the wind energy system 16, in step 114.

The second active power set point may be determined based on the active power request. For example, the PPC 34 may determine the second active power set point to correspond to the active power request.

The second active power set point is dispatched by the PPC 34 to the wind energy system 16, which causes the wind energy system 16 to make use of the active power energy reserve, and thereby increase the active power output towards the second active power set point. For example, in response to receiving the second active power set point, the unit controllers 32 of the wind energy system 16 may control the WTGs 22 to increase the active power output using the active power reserve. In particular, the wind energy system 16 may be configured to ramp up the active power output from the energy store to the second active power set point. Typically, generator systems may be configured to ramp up the active power output at a predetermined ramp rate corresponding to the initial power shortage. It shall be appreciated that due to safety constraints, and inertial limitations, the ramp up rate of a generator system, such as the wind energy system 16, is limited such that it is slower than the ramp up rate of the battery energy storage system 18. Nonetheless, controlling both the battery energy storage system 18 and the wind energy system 16 during the first power stage may provide the fastest possible response to the frequency deviation.

However, if it is determined, in step 112, that the initial power shortage is less than the power limit of the battery energy storage system 18 (i.e. the first active power set point), the method may proceed to step 116 instead, as shown in FIG. 3.

In step 116, the PPC 34 monitors the active power output of the battery energy storage system 18 and detects when the active power output has reached the first active power set point. In other words, in step 116, the PPC 34 detects when the active power output from the battery energy storage system 18 to the main grid 26 has increased to the first active power setpoint.

Upon detecting that the active power output from the battery energy storage system 18 is equal to the first active power set point, the first power sequence is terminated, in sub-step 117, and the PPC 34 is configured to initiate a second power stage of the power sequence, in step 118, as shown in FIG. 2.

During the second power stage, the PPC 34 is configured to satisfy the active power request by maximising the power contribution from the wind energy system 16 and controlling the battery energy storage system 18 to conserve energy reserves in the energy store by minimising the active power output therefrom.

Figure 4:
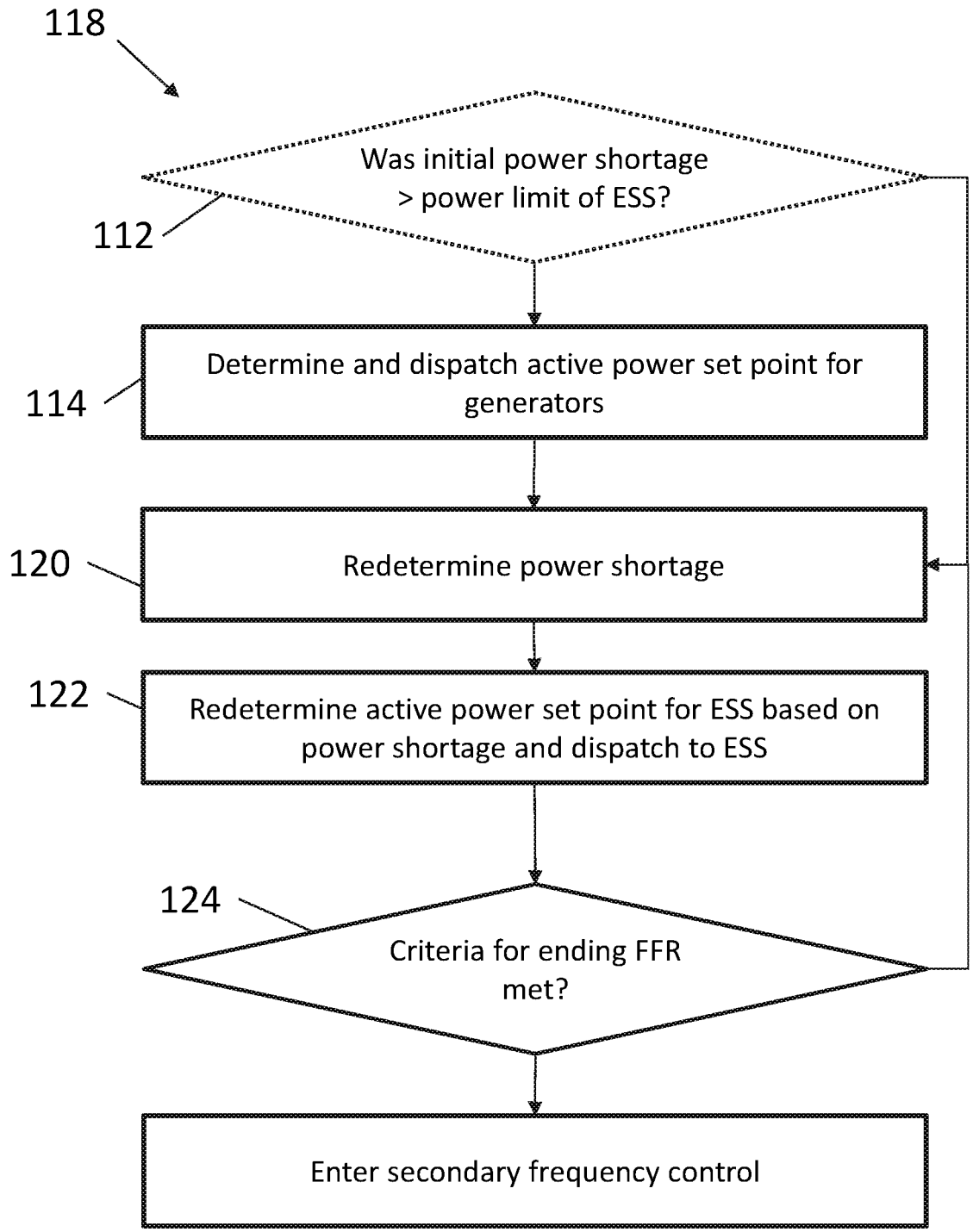
FIG. 4 shows further example sub-steps, in accordance with an embodiment of the invention, of the method shown in FIG. 2.

An example of the second power stage is shown in FIG. 4, as shall be described in more detail below.

As shown in FIG. 4, if it was determined, in step 112, that the initial power shortage was less than the power limit of the battery energy storage system 18, then upon detecting, in step 116, that the battery energy storage system 18 has reached the first active power set point, the PPC 34 may determine and dispatch the second active power set point to the wind energy system 16, or more generally the generator system, substantially as described in step 114.

Accordingly, in either condition, the active power output from the wind energy system 16 is controlled to increase towards the second active power set point during the second power stage. In this manner, the wind energy system 16 is controlled to ramp up the active power output using the active power reserve to minimise, or negate, the power shortage between the active power request and the active power output of the wind energy system 16.

Hence, as the active power output from the wind energy system 16 increases during the second power stage, the PPC 34 continuously, or periodically, updates the first active power set point for the battery energy storage system 18 to minimise the additional active power contribution therefrom.

Accordingly, upon initiating the second power stage, the PPC 34 may proceed through steps 120 to 126, as described below, until one or more criteria for entering 'secondary frequency control' have been satisfied, e.g. once the frequency level reaches a plateau that is within threshold values of the nominal frequency.

In step 120, the PPC 34 redetermines the power shortage between the active power request and the active power output of the WTGs 22 (or more generally the renewable energy generators). For example, the PPC 34 may receive a feedback measurement of the active power output from the WTGs 22 and compare the measurement to the active power request to redetermine the power shortage.

Here it shall be appreciated that the power shortage changes during the second power stage, for example due to changes in the available active power of the generator system 16 (e.g. due to changes in wind speed) and/or as the active power output from the generator system 16 ramps up using the active power reserve.

In step 122, the PPC 34 determines a new active power set point (i.e. a third active power set point) for the battery energy storage system 18 based on the power shortage, determined in step 120, and dispatches the third active power set point to the battery energy storage system 18.

Here, the PPC 34 controls the battery energy storage system 18 to provide the minimum contribution of active power output required to satisfy the active power request as the active power output of the wind energy system 16 increases.

While the power shortage, determined in step 120, is greater than, or equal to, the power limit of the battery energy storage system 18, the third active power set point is determined and dispatched to maintain a constant active power output from the battery energy storage system 18 at the power limit.

However, once the power shortage, determined in step 120, falls below the power limit of the battery energy storage system 18, the third active power set point is determined and dispatched to reduce the active power output from the battery energy storage system 18. For example, as the active power output of the wind energy system 16 increases at a predefined ramp rate, the third active power set point may be determined and dispatched to the battery energy storage system 18 to cause the battery energy storage system 18 to reduce the active power output from the energy store at the same rate. For example, a ramp rate limit may be applied to the battery energy storage system 18, in response to receiving the third active power set point, to cause the battery energy storage system 18 to ramp down its active power output towards the third active power set point at the same rate at which the active power output from the wind energy system 16 increases. In particular, in response to receiving the third active power set point, the unit controllers 32 of the battery energy storage system 18 may control the discharge of active power from the energy store by applying one or more ramp rate limits based on the wind energy system 16, in order to ramp down the active power output from the energy store to the third active power set point at the same rate as the active power output from the wind energy system 16 increases. In this manner, the total active power output from the PP 12 corresponds to the active power request as the active power output from the battery energy storage system 18 reduces and the active power output from the wind energy system 16 increases.

Eventually the wind energy system 16 may ramp up to the active power request and the active power output from the battery energy storage system 18 may be reduced to zero.

Thereafter the wind energy system 16 may continue to satisfy the active power request until the PPC 34 determines that the criteria for ending FFR has been satisfied, in step 124. For example, upon detecting that the frequency level has reached a plateau that is within threshold values of the nominal frequency, and the subsequent period of 'secondary frequency control' is entered.

Of course, if the available active power of the wind energy system 16 reduces at any point during the second power stage, such that the wind energy system 16 is unable to satisfy the active power request, the PPC 34 may redetermine the third active power set point accordingly to increase the active power output from the battery energy storage system 18 and satisfy the power shortage.

In this manner, after an FFR trigger, the PPC 34 determines the additional active power needed to support recovery of the grid frequency and first commands the battery energy storage system 18 to increase its active power output as quickly as possible to supply that additional active power, before entering a second power stage during which that contribution is reduced accordingly as the active power contribution from the slower generator system 16 of the PP 12 increases.

The configurations and control strategies are described further below, with reference to the applications in FIGS. 5 to 8. FIGS. 5 to 8 are charts illustrating how the contribution from the battery energy storage system 18 and the wind energy system 16 (or generator system) is provided to fulfil the additional active power required for supporting the main grid 26 according to the method 100. As each chart has an appropriate legend, additional labelling with reference signs will only be provided where necessary for clarity.

Figure 5:
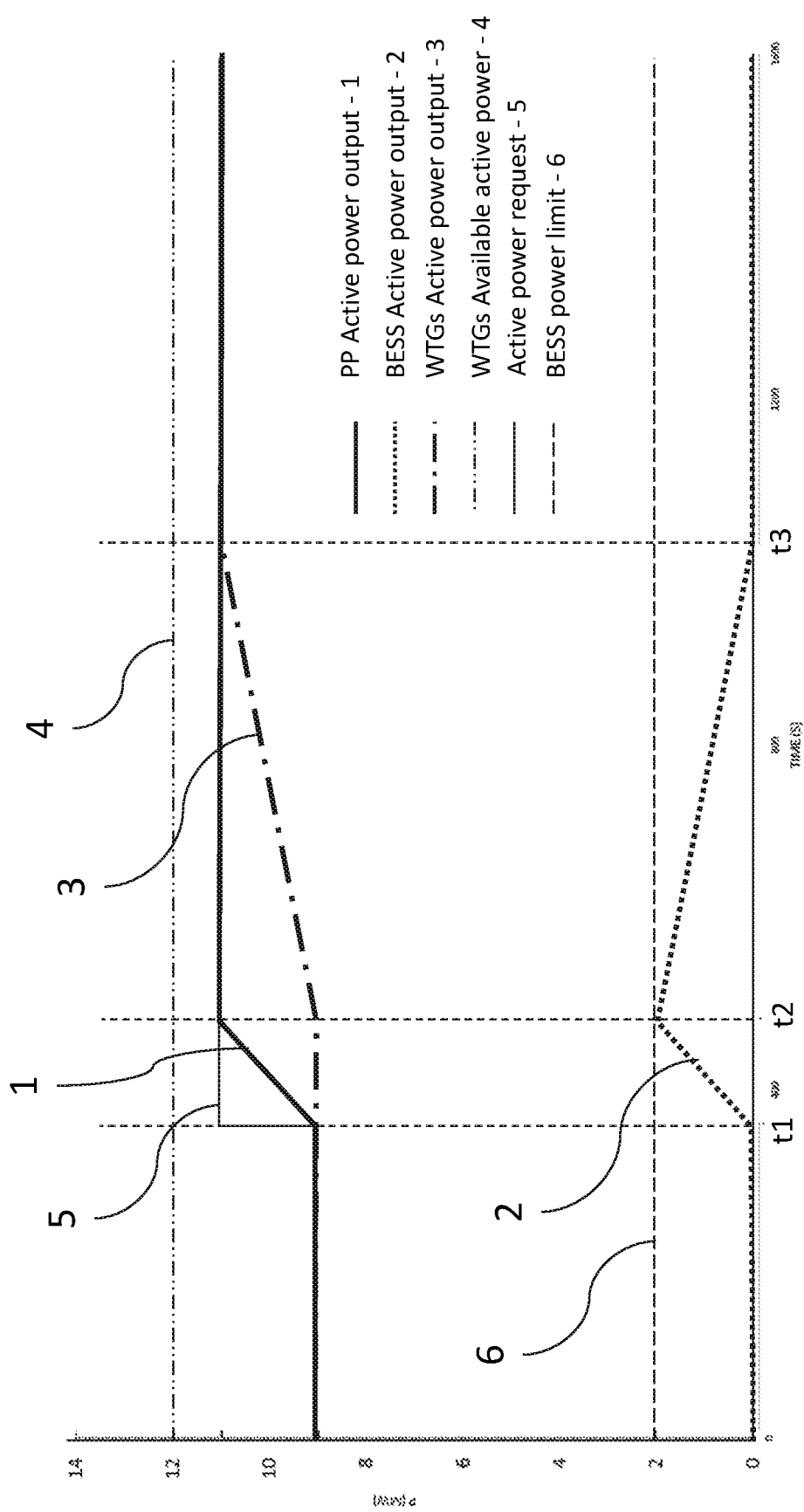
FIGS. 5 to 8 are charts illustrating the operation of the power plant of FIG. 1, according to the method of FIG. 3, for a selection of use cases.

A first application is shown in FIG. 5. Prior to the under-frequency event, the generator system, i.e. the wind energy system 16 in this example, may be satisfying an active power request or demand with an active power reserve. For example, the wind energy system 16 may be providing an active power output of 9 MW, where the available active power output is 12 MW, such that there is 3 MW in reserve. The battery energy storage system 18 may have zero or negligible active power output during this period.

At the time, t1, the FFR trigger is issued following a frequency deviation below the frequency threshold. Accordingly, in step 102, an increased active power request is determined at the PPC 34. The active power request may be 11 MW to the main grid 26, for example. In step 104, the PPC 34 initiates a first power stage of the active power sequence and determines, in step 106, an initial power shortage of the WTGs 22 relative to the active power request. The initial power shortage may therefore be 2 MW, as shown in FIG. 5. In steps 108 and 110, the PPC 34 determines and dispatches a first active power set point for the battery energy storage system 18 based on the initial power shortage. Accordingly, the first active power set point may be set to 2 MW, which may correspond to a limited or rated power output of the battery energy system 18. The first active power set point is dispatched to the battery energy storage system 18 to cause the battery energy storage system 18 to ramp up the active power output to 2 MW as quickly as possible. At the same time, the PPC 34 may determine, in step 112, that the initial power shortage does not exceed the power limit of the battery energy storage system 18 (i.e. does not exceed the first active power set point), and so the active power output from the wind energy system 16 may be maintained substantially constant.

Hence, between time t1 and t2, the active power output of the battery energy storage system 18 increases towards the first active power set point. In particular, as shown in FIG. 5, the active power output of the battery energy storage system 18 ramps up at a constant rate to the first active power set point of 2 MW. Although this is shown to be a gradual increase in FIG. 2 it shall be appreciated that, in practice, the increase may be achieved in a matter of milliseconds, for example in about 120 milliseconds. The wind energy system 16 continues to provide a constant active power output of 9 MW during this period. Hence, the total active power output of the PP 12 to the main grid 26 increases from 9 MW to 11 MW.

At the time, t2, the PPC 34 detects, in step 116, that the active power output of the battery energy storage system 18 has reached the first active power set point and the first power stage is therefore terminated, in step 117. In step 118, the PPC 34 initiates the second power stage of the power sequence.

Accordingly, as it was determined, in step 112, that the initial power shortage was less than the power limit of the battery energy storage system 18, upon detecting, in step 116, that the battery energy storage system 18 has reached the first active power set point, the PPC 34 may determine and dispatch a second active power set point to the wind energy system 16, in step 114. The second active power set point is determined based on the active power request and may therefore be set to 11 MW, corresponding to the active power request. Dispatching the second active power set point to the wind energy system 16 causes the wind energy system 16 to use the active power energy reserve, and thereby increases the active power output towards the second active power set point. Accordingly, the active power output of the wind energy systems 16 increases at a relatively slow ramp rate, from 9 MW to 11 MW between time t2 and t3.

The PPC 34 therefore proceeds to determine a new active power set point (i.e. the third active power set point) for the battery energy storage system 18 to minimise its active power contribution during the second power stage. To achieve this, whilst also ensuring that the active power request is satisfied, the PPC 34 may redetermine the third active power set point for the battery energy storage system 18 continuously, or periodically, during the second power stage, according to steps 120 to 122. Feedback measurements of the active power output of the wind energy system 16 are received, in step 120, to redetermine the active power shortage and the third active power set point is redetermined, in step 122, according to the current power shortage.

Hence, between the time t2 and t3, the active power output from the battery energy storage system 18 reduces from 2 MW to 0 MW as the active power output from the wind energy system 16 increases from 9 MW to 11 MW. The active power output from the battery energy storage system 18 ramps down at the same rate as the active power output from the wind energy system 16 ramps up, for example, at a rate of 0.3 MW/s. After the time t3, the active power output from the battery energy storage system 18 is zero, conserving the energy in the energy store, and the active power output of the wind energy system 16 is equal to the active power request. This may continue until the PPC 34 receives a signal indicating, or otherwise determines, that the criteria for ending FFR has been satisfied, in step 124.

In this manner, the under-frequency event is rapidly counteracted with the active power request being satisfied with minimal delay following the FFR trigger. In particular, the time taken to provide the active power request corresponds to the time taken for the battery energy storage system 18 to reach the first active power set point, which is 120 milliseconds in this example. Accordingly, the frequency deviation is rapidly counteracted, providing a fast frequency response.

Figure 6:
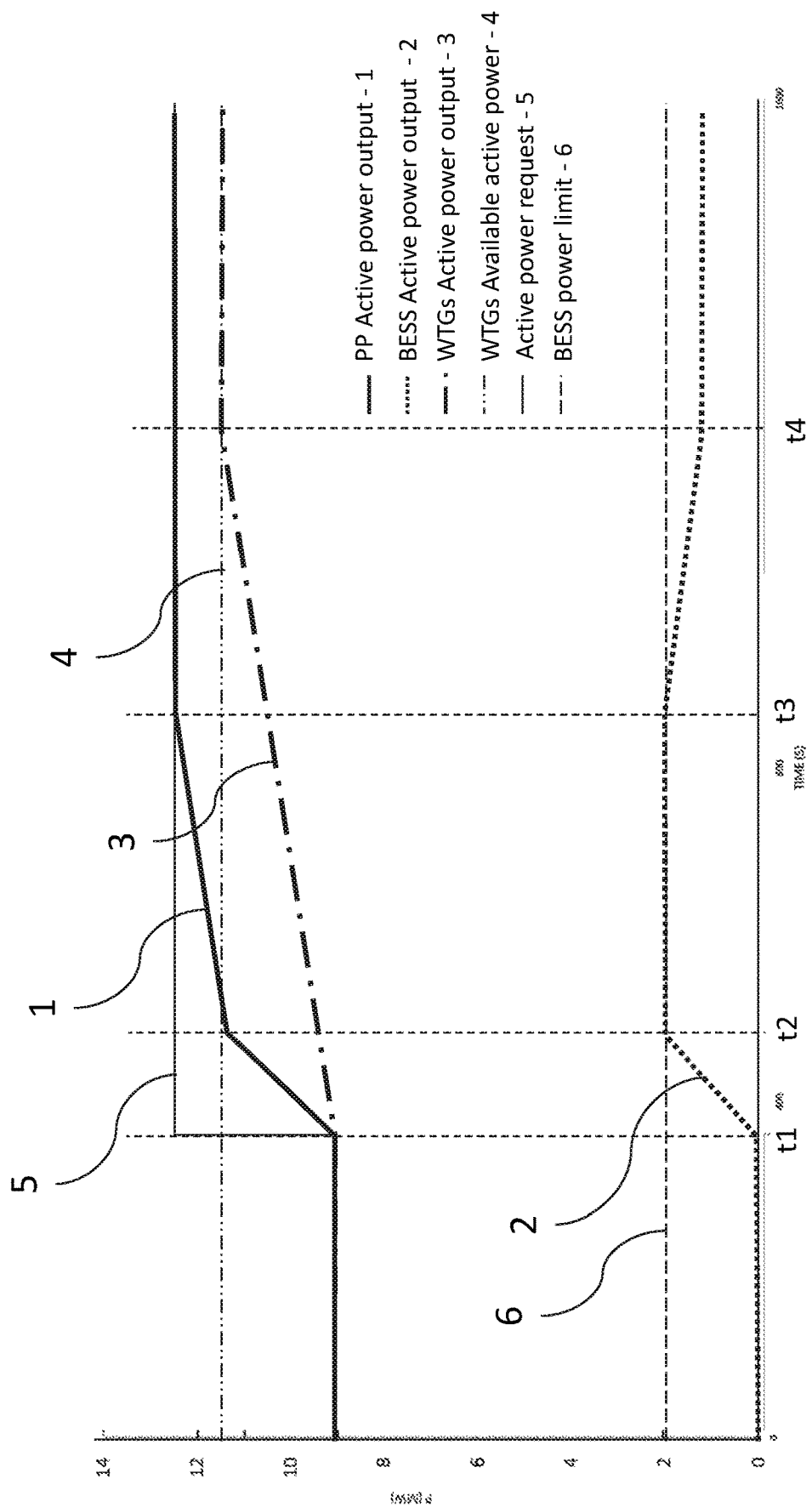

A second application is shown in FIG. 6. In the second application, the conditions differ in that, in response to the frequency deviation, the active power request is increased further, to the extent that the active power request is greater than the available active power of the wind energy systems 16. For example, the active power request may be 12 MW and the available active power may be 11.5 MW.

Accordingly, the PPC 34 may determine the active power request and determine the first active power set point of 2 MW for the battery energy storage system 18, in steps 102 to 110, substantially as described previously. However, in this case, the initial power shortage, determined in step 112, is greater than the power limit of the battery energy storage system 18 (i.e. greater than the first active power set point). In particular, when the active power request is received at the time t1, the power shortage is 3 MW, which exceeds the 2 MW rated power output of the battery energy storage system 18. Hence, the PPC 34 also determines and dispatches the second active power set point for the wind energy system 16, according to steps 112 and 114, at the time t1. Here it shall be appreciated that the second active power set point is set to use the full amount of available active power based on the active power request of 12 MW. Accordingly between the time t1 and t2, the power outputs from the battery energy storage system 18 and the wind energy system 16 ramp us towards the respective set points. As shown in FIG. 6, the battery energy storage system 18 is a faster discharge system and so the ramp up rate is greater than the ramp up rate of the wind energy system 16. Hence, at the time t2, the active power output from the battery energy storage system 18 reaches the first active power set point of 2 MW. The PPC 34 detects this condition, in step 116, and proceeds to terminate the first power stage, in step 117, and initiate the second power stage, in step 118. During the second power stage, the PPC 34 redetermines the power shortage between the active power request and the active power output of the wind energy system 16, in step 120, and adjust the third active power set point for the battery energy storage system 18 accordingly. At the start of the second power stage, the power shortage remains larger than 2 MW and so, in step 122, the PPC 34 determines that the third active power set point for the battery energy storage system 18 should be set or maintained at 2 MW, whilst the active power output of the wind energy systems 16 continues to rise. At the time t3, the power shortage reduces to 2 MW and, thereafter, as the active power output of the wind energy system 16 continues to ramp up, the PPC 34 reduces the third active power set point for the battery energy storage system 18 accordingly. For example, the third active power set point for the battery energy storage system 18 may be reduced to cause the battery energy storage system 18 to ramp down the active power output at the same rate as the active power output of the wind energy system 16 ramps up. Hence, at the time t4, the active power output of the wind energy system 16 is equal to the available active power and there is no active power reserve left. However, the power shortage between the active power request and the active power output of the wind energy system 16 is still non-zero.

Therefore, the PPC 34 sets the third active power set point of the battery energy storage system 18 to satisfy the power shortage, as shown in FIG. 6. For example, the battery energy storage system 18 may be controlled to provide a constant active power output of 0.5 MW to satisfy the power shortage between the active power request of 12 MW and the available active power of 11.5 MW.

Figure 7:
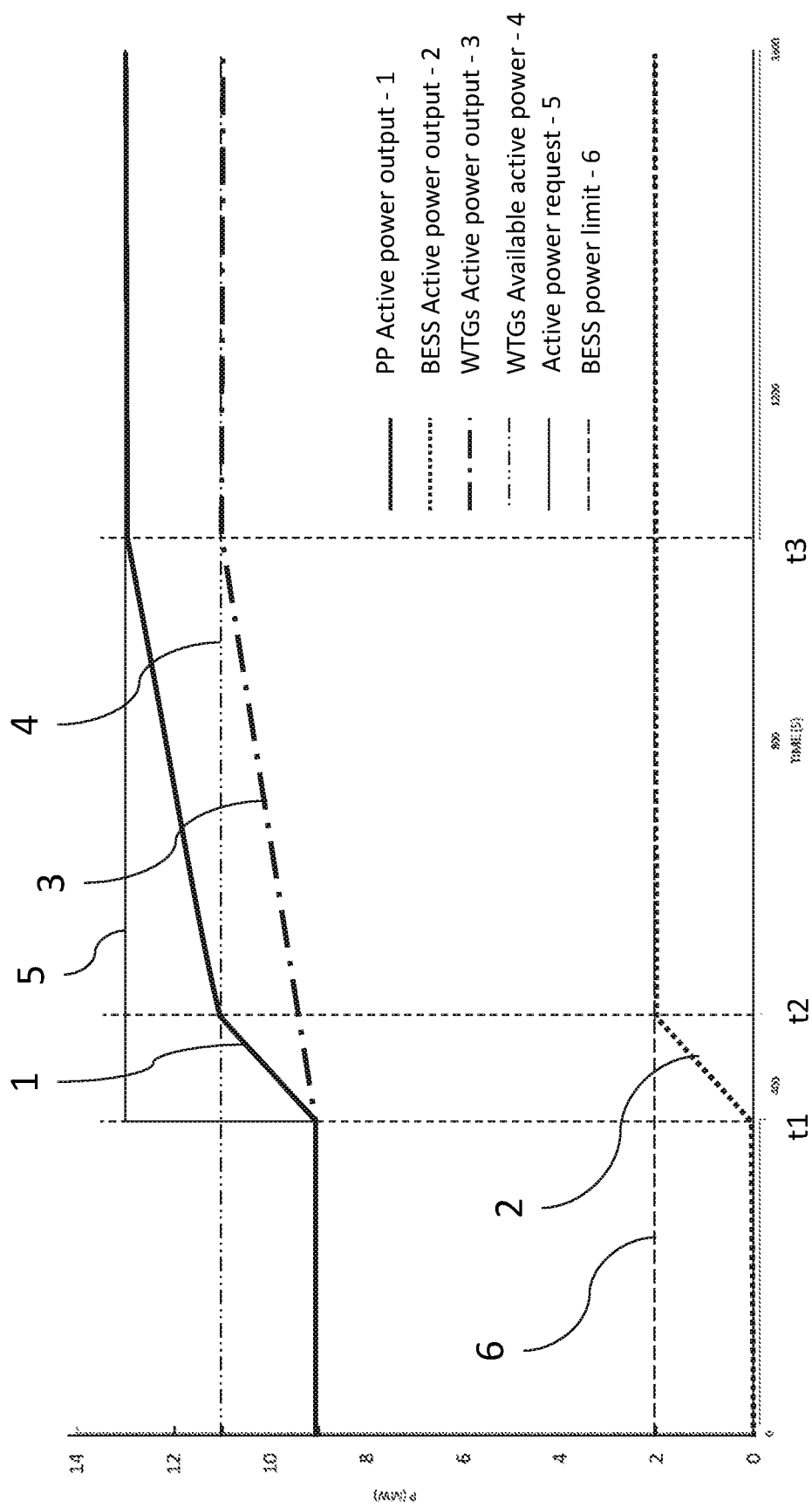

A third application is shown in FIG. 7. In the third application, the conditions are very similar to those of the second application in that, during the under-frequency event, the active power request is increased to the extent that it exceeds the available active power of the wind energy system 16. However, in the third application, the power shortage between the active power request and the available active power of the wind energy system 16 is equal to the power limit of the battery energy storage system 18. For example, the active power request may be 12 MW and the available active power may be 10 MW. Accordingly, as shown in FIG. 7, the PP 12 is controlled substantially as described in relation to FIG. 6, until the time t3, where the active power output of the wind energy system 16 is equal to the available active power and the power shortage between the active power request and the active power output of the wind energy system 16 remains equal to the rated power output of the battery energy storage system 18. Accordingly, after the time t3, the PPC 34 controls the battery energy storage system 18 to continue providing an active power output at the rated power output of 2 MW.

Figure 8:
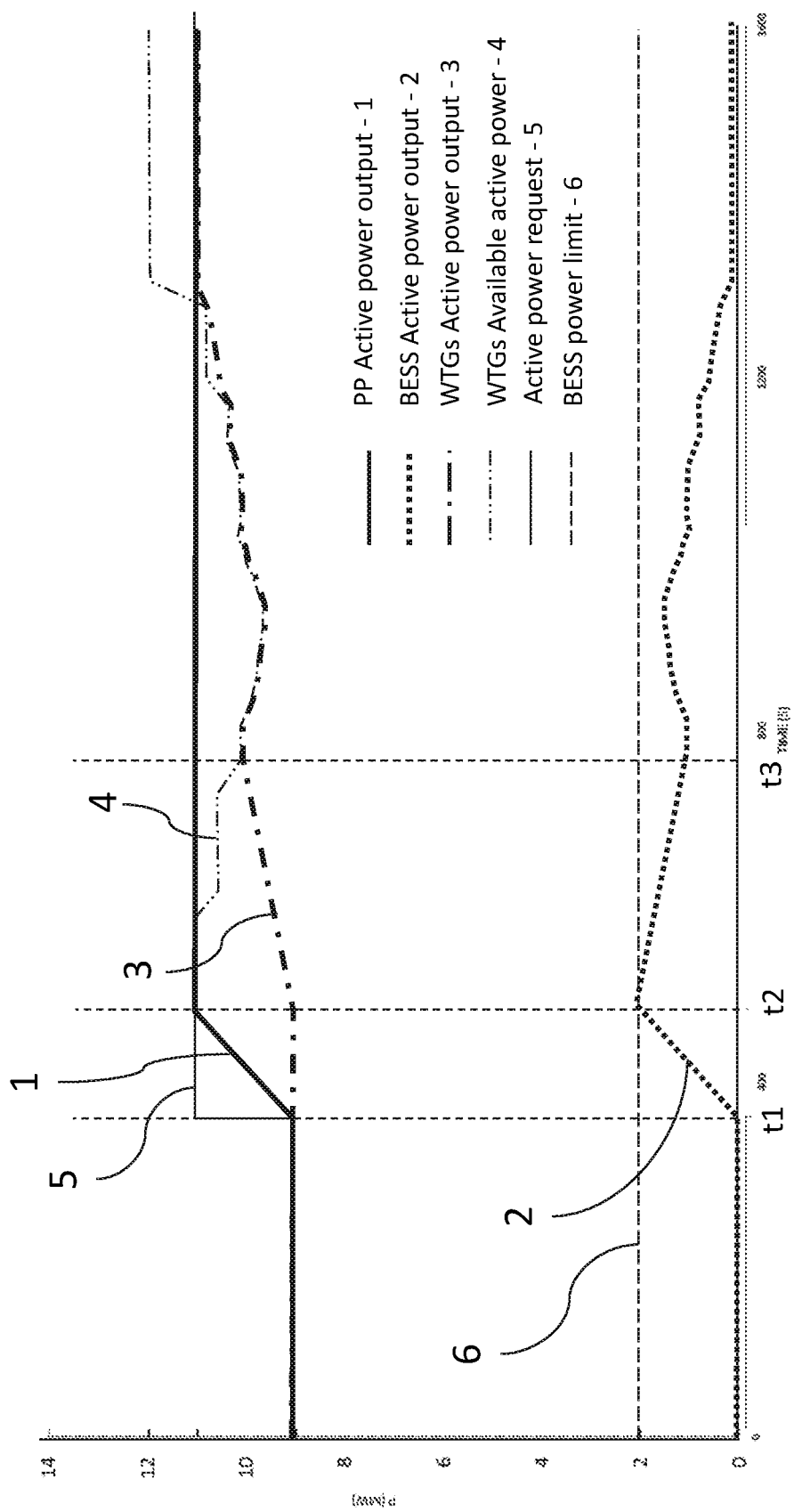

A fourth application is shown in FIG. 8. In this application, the available active power for the wind energy system 16 varies during the frequency event. For example, the power available as part of the reserve of the WTGs 22 may fluctuate due to changes in wind speed. Accordingly, during the second power stage (after the time t2), the PPC 34 may continuously or repeatedly redetermine the third active power set point for the battery energy storage system 18, in steps 120 and 122, to satisfy the active power request as the active power output of the wind energy system 16 fluctuates. Hence, as shown in FIG. 8, as the active power output of the wind energy system 16 ramps up between the time t2 and t3, the PPC 34 may control the battery energy storage system 18 to ramp down the active power output at the same rate. However, after the time t3, the wind energy system 16 is controlled by the active power set point to use all of the active power reserve, but fluctuations in the available active power output mean that the power shortage between the active power request and the active power output of the wind energy system 16 varies. Accordingly, the PPC 34 repeatedly determines, in step 120, the power shortage, and re-determines the third active power set point for the battery energy storage system 18, in step 122, to satisfy the power shortage. Hence, as can be seen in FIG. 8, the active power output of the battery energy storage system 18 effectively mirrors the active power output of the wind energy system 16 reducing when the available active power increases and increasing when the available active power reduces. In this manner, the PP 12 continues to satisfy the active power request despite the fluctuations in the available active power. Hence, if the capacity of the generator system 16 increases or decreases, during the response, the contributions may be redistributed accordingly.

From the above, it shall be appreciated that the provision of the present embodiment may enable a faster response to a frequency deviation, supporting a faster return of the grid to normal operating conditions.

While the above description is provided in relation to under-frequency events, it will be appreciated that frequency may also rise above the nominal frequency in an over-frequency event. The above techniques may also be applied to over-frequency events such that configurations including the priority sequence are applied to how the active power from the generator systems 16 is curtailed and transferred to the battery energy storage system 18. As will be appreciated, this will be managed with respect to a minimum viable output of the generators, particularly for WTGs.

Furthermore, it shall be appreciated that the values used in the example applications described above are provided by way of example only. Additionally, reference to first, second and third active power set points in the above description, merely relates to the order in which the determined active power set points are described and not necessarily an order in which the set points are determined and/or dispatched.

It will be appreciated that various changes and modifications can be made to the present invention without departing from the scope of the present application.

For example, although the invention has been described above in relation to a renewable energy power plant having a single type of generator system, it shall be appreciated that the invention is equally applicable to other types of renewable energy power plant, such as a hybrid power plant (HPP) having two or more types of generator systems in addition to an energy storage system. For example, in addition to the wind power system 16, and the battery energy storage system 18, in the example described above, the HPP may further include a solar power system. The solar power system may comprises a plurality of photovoltaic (PV) generators, more commonly known as PV cells, configured to convert solar energy into electrical energy. Each PV generator may be considered as a further power unit, which is connected to a local grid (not shown) linking the power units and a suitable inter-system grid or a collector bus may link the solar power system, the wind energy system 16 and the battery energy storage system 18 together. Via this grid or collector bus, the HPP may be connected to the main grid 26 (also called a main power network) via a connecting network 28. In this manner, each type of generator, i.e. the PVs and the WTG 22, is capable of providing additional active power beyond its normal active power generation during fast frequency response in at least one way. For example, PV generators are able to provide a reserve of active power in the same way as described above for WTGs 22, which is functionally equivalent to spinning reserve. To do so, a portion of the active power production capability of the generators has to be set aside for use in providing such a reserve.

It shall be appreciated that, in such an example, each of the PV cells 20 may similarly be associated with a respective power unit controller 32, as described previously, and a sub-set of the PV cells 20 may share a single, semi-centralised controller, such that there are fewer power unit controllers than power units. As would be apparent to the skilled person, the power unit controller 32 can be considered to be a computer system capable of operating a PV cell 20, in the manner prescribed herein, and may comprise multiple modules that control individual components of each PV cell 20.

Where the PPC 34 is configured to control the active power output of the wind energy system 16, in the example described above, it shall be appreciated that the same operations may be executed for collectively controlling the generator systems, i.e. the wind energy system 16 and the solar power system of a HPP. For example, the second active power set point, determined and dispatched to the wind energy system 16, in step 114, may instead be determined and dispatched to both generator systems, i.e. the wind energy system 16 and the solar power system in the HPP. Additionally, or alternatively, the PPC 34 may determine respective active power set points for the wind energy system 16 and the solar power system, in step 114, thereby splitting the active power contribution to meet the active power request between the WTGs 22 and the PV cells, until both their reserve capacities are fully utilised. For example, the PPC 34 may determine a percentage contribution from each of the generator systems.

The invention claimed is:

1. A method of controlling a renewable energy power plant connected to a power network, the renewable energy power plant comprising one or more renewable energy generators having an active power reserve for supplying additional active power to the power network and an energy storage system having an active power store, the method comprising, in response to detecting a frequency event on the power network:

determining an active power request for the renewable energy power plant based on the frequency event; and implementing a power sequence to manage the additional active power from the energy storage system and the one or more renewable energy generators to satisfy the active power request, the power sequence comprising:

initiating a first power stage in response to detecting the frequency event, wherein the active power contribution from the energy storage system is controlled during the first power stage by:

determining an initial power shortage between the active power request and the active power output from the one or more renewable energy generators;

determining a first active power set point for the energy storage system based on the initial power shortage, dispatching the first active power set point to the energy storage system to cause the energy storage system to increase the active power output to the power network from the active power store; and detecting when the active power output from the energy storage system is equal to the first active power set point; and initiating a second power stage once the active power output from the energy storage system is equal to the first active power set point, wherein the active power contribution from the energy storage system is controlled during the second power stage by:

determining a subsequent power shortage between the active power request and the active power output from the one or more renewable energy generators; and determining and dispatching a second active power set point for the energy storage system based on the subsequent power shortage.

2. The method according to claim 1, wherein the first power stage or the second power stage further comprises:

determining a third active power set point for the one or more renewable energy generators based on the active power request, and dispatching the third active power set point to the one or more renewable energy generators, to cause the one or more renewable energy generators to increase the active power output to the power network using the active power reserve.

3. The method according to claim 2, wherein:

the third active power set point is determined and dispatched to the one or more renewable energy generators during the first power stage if the initial power shortage is greater than the first active power set point; or the third active power set point is determined and dispatched to the one or more renewable energy generators during the second power stage if the initial power shortage is less than, or equal to, the first active power set point.

4. The method according to claim 2, wherein dispatching the third active power set point to the one or more renewable energy generators causes the one or more renewable energy generators to ramp up the active power output from the active power reserve at a first ramp rate.

5. The method according to claim 4, wherein dispatching the first active power set point to the energy storage system causes the energy storage system to ramp up the active power output from the energy store at a greater ramp rate than the first ramp rate.

6. The method according to claim 5, wherein dispatching the first active power set point to the energy storage system causes the energy storage system to ramp up the active power output from the energy store at a maximum ramp rate for the energy storage system.

7. The method according to claim 2, wherein dispatching the second active power set point to the energy storage system causes the energy storage system to ramp down the active power output from the energy store at a second ramp rate during the second power stage if the active power reserve of the one or more renewable energy generators is greater than, or equal to, the determined subsequent power shortage.

8. The method according to claim 7, wherein the first power stage or the second power stage further comprises:

determining a third active power set point for the one or more renewable energy generators based on the active power request, and dispatching the third active power set point to the one or more renewable energy generators, to cause the one or more renewable energy generators to increase the active power output to the power network using the active power reserve;

wherein dispatching the third active power set point to the one or more renewable energy generators causes the one or more renewable energy generators to ramp up the active power output from the active power reserve at a first ramp rate; and wherein the second ramp rate is of equal magnitude to the first ramp rate.

9. The method according to claim 2, wherein dispatching the third active power set point to the one or more renewable energy generators causes the one or more renewable energy generators to maximise the active power contribution from the active power reserve during the second power stage.

10. The method according to claim 1, wherein the power sequence is implemented to provide a fast frequency response to the frequency event, and wherein the active power request corresponds to an amount of active power to be provided by the renewable energy power plant to the power network to provide the fast frequency response.

11. The method according to claim 1, wherein the energy storage system is a battery energy storage system.

12. The method according to claim 1, wherein the renewable energy power plant is a hybrid power plant.

13. The method according to claim 12, wherein the one or more renewables energy generators comprises one or more: wind turbine generators, and/or photovoltaic generators.

14. The method according to claim 1, wherein the second active power set point is continuously, or periodically, redetermined during the second power stage.

15. A power plant controller, comprising:

at least one processor programmed with code which when executed is configured to perform operation for controlling a renewable energy power plant connected to a power network, the renewable energy power plant comprising one or more renewable energy generators having an active power reserve for supplying additional active power to the power network and an energy storage system having an active power store, the operation comprising, in response to detecting a frequency event on the power network:

determining an active power request for the renewable energy power plant based on the frequency event; and implementing a power sequence to manage the additional active power from the energy storage system and the one or more renewable energy generators to satisfy the active power request, the power sequence comprising:

initiating a first power stage in response to detecting the frequency event, wherein the active power contribution from the energy storage system is controlled during the first power stage by:
  determining an initial power shortage between the active power request and the active power output from the one or more renewable energy generators;
  determining a first active power set point for the energy storage system based on the initial power shortage;
  dispatching the first active power set point to the energy storage system to cause the energy storage system to increase the active power output to the power network from the active power store; and
  detecting when the active power output from the energy storage system is equal to the first active power set point; and initiating a second power stage once the active power output from the energy storage system is equal to the first active power set point, wherein the active power contribution from the energy storage system is controlled during the second power stage by:
  determining a subsequent power shortage between the active power request and the active power output from the one or more renewable energy generators; and
  determining and dispatching a second active power set point for the energy storage system based on the subsequent power shortage.

16. The power plant controller according to claim 15, wherein the first power stage or the second power stage further comprises:
  determining a third active power set point for the one or more renewable energy generators based on the active power request, and
  dispatching the third active power set point to the one or more renewable energy generators, to cause the one or more renewable energy generators to increase the active power output to the power network using the active power reserve.

17. The power plant controller according to claim 16, wherein:
  the third active power set point is determined and dispatched to the one or more renewable energy generators during the first power stage if the initial power shortage is greater than the first active power set point; or
  the third active power set point is determined and dispatched to the one or more renewable energy generators during the second power stage if the initial power shortage is less than, or equal to, the first active power set point.

18. The power plant controller according to claim 16, wherein dispatching the third active power set point to the one or more renewable energy generators causes the one or more renewable energy generators to ramp up the active power output from the active power reserve at a first ramp rate.

19. The power plant controller according to claim 18, wherein dispatching the first active power set point to the energy storage system causes the energy storage system to ramp up the active power output from the energy store at a greater ramp rate than the first ramp rate.

* * * * *